United States Patent
Cruickshank

[15] 3,690,242
[45] Sept. 12, 1972

[54] PHOTO RECORDING ASSEMBLY

[72] Inventor: John S. Cruickshank, "Rosemount," Kintillo Road, Bridge of Earn, Perth, Scotland

[22] Filed: June 22, 1970

[21] Appl. No.: 48,215

[30] Foreign Application Priority Data

June 20, 1969 Great Britain..........31,388/69

[52] U.S. Cl. ..............................95/82, 95/12, 355/48
[51] Int. Cl. .............................................G03b 27/50
[58] Field of Search ................355/47, 48; 95/12, 82

[56] References Cited

UNITED STATES PATENTS

| | | |
|---|---|---|
| 3,244,065 | 4/1966 | Lemelson ................355/47 X |
| 3,495,516 | 2/1970 | Henderson ....................95/12 |
| 706,459 | 8/1902 | Selke............................95/82 |
| 1,382,978 | 6/1921 | Hopkins....................95/12 X |
| 1,546,636 | 7/1925 | Engelmann................95/12 X |
| 2,066,996 | 1/1937 | Morioka....................95/12 X |
| 3,267,799 | 8/1966 | Harrison..................355/48 X |

Primary Examiner—Samuel S. Matthews
Assistant Examiner—Richard A. Wintercorn
Attorney—Molinare, Allegretti, Newitt & Witcoff

[57] ABSTRACT

The assembly makes series of photographs of an object so as to record outlinechanges thereof through a preselected angular and/or longitudinal distance. It has a structure comprising an inner portion on which the object is placed, and an outer portion carrying a camera and a light projector. The inner and outer portions are rotatably relative to each other.

5 Claims, 3 Drawing Figures

PATENTED SEP 12 1972

3,690,242

INVENTOR:
John Smith Cruickshank
By Dwell Howell
attorneys

PHOTO RECORDING ASSEMBLY

DESCRIPTION OF INVENTION

The invention relates to a photo recording assembly for making a series of photographs of an object so that the outline changes of the photographed object occurring through a preselected angular and/or longitudinal distance are recorded on a photographic film.

An assembly according to the invention comprises a structure having an inner portion and an outer portion, the portions being rotatable relative to each other, the inner portion carrying means for supporting the photographed object and the outer portion carrying a camera and at least one projector for illuminating the person or object.

The invention now will be described, by way of example, with reference to the accompanying drawings, wherein.

Figures 1, 2, 3:
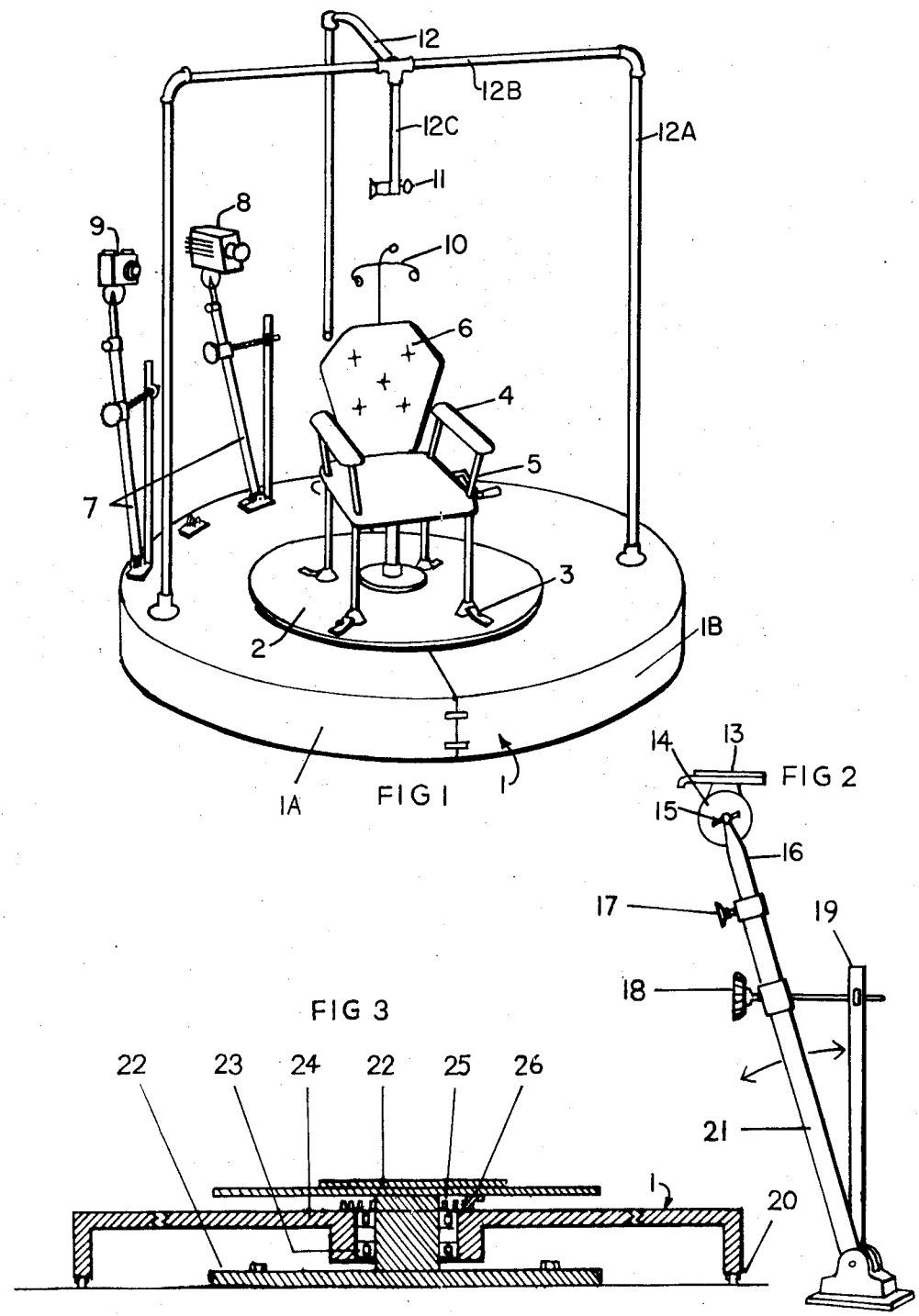
FIG. 1 is a perspective view of an assembly, according to the invention.
FIG. 2 is a camera and projector stand.
FIG. 3 is an axial section through the platform.

The assembly comprises a substantially circular platform, formed by an outer annular portion 1 and an inner circular portion 2. In the illustrated example, the inner portion is stationary and the outer portion is rotatable about the inner portion. It will be understood that the outer portion can be stationary and the inner portion rotatable inside the outer portion.

The inner portion illustrated in the drawings carries a chair 4, the arm supports of which are movable towards or away from each other and adjustable in a predetermined position by a mechanism 5 containing tilting nuts actuated by a threaded shaft which is operated by a handwheel. The chair-back 6 can be tilted and adjusted by a similar mechanism (not shown). The chair 4 is provided with an adjustable head and neck support 10, and is secured to the inner portion 2 by means of quick release clamps 3, so that it can easily be removed and substituted by a plinth for an article to be photographed.

The outer portion 1, consists of two similar interconnected halves 1A, 1B and carries a superstructure 12 consisting of legs formed by interconnected vertical 12A and horizontal 12B tubes, secured at one end to the outer portion 1, and at the other end connected to a central piece 12C, which latter carries a setting bar 11 and a counter. The setting bar 11 is in the axis of rotation of the outer portion 1.

The outer portion 1 carries also two identical stands 7. One of the stands carries a camera 9, the other a projector 8 illuminating the photographed person or object.

The inner portion 2 comprises a base-plate 22 (FIG. 3) with a shaft portion carrying bearings 23 for rotatable ring unit 24 adapted to be connected to the outer portion 1. A series of pins 25 is attached to the upper surface of the rotatable ring unit 24 and distributed at equal angular distances from each other around the axis of rotation. The pins are adapted to actuate a micro-switch 26, attached to the inner portion 2, as the outer portion is turned around the inner portion.

The outer portion 1 is carried by a plurality of adjustable trolley wheels 20.

Each of the stands 7 consist of a base carrying a fixed upright member 19 and a telescopic unit consisting of an outer tubular element 21 containing an inner element 16 slidable therein and adjustable in any selected raised or lowered position by a lock screw 17. The outer element 21 is attached to the upright member 19 by adjusting means 18 comprising a bolt and nut assembly, so that it can be swivelled through at least 45°. The inner element of the telescopic unit carries a penoramatic head comprising means 13 for rotary movement, means 14 for swivel movement and locking mechanism for both and said means, of which only lock mechanism 15 for the means 14 is illustrated. The means 13 is in a manner known per se adapted to carry either the projector 8 or the camera 9. The camera 9 used in the described embodiment is a photographic camera with electrically controlled shutter and automatic rewind mechanism connected to an electric circuit operated by the micro-switch 26 which is actuated by the said pins 25. A cine camera synchronixed to the 360° movement can be used instead. The projector 8 is adapted to project a beam of high intensity light through a slit onto the photographed person or article.

At least one of the stands 7 is adapted to be angularly displaceable relative to the other stand, so that the angular distance between the camera and projector can be changed, preferably between 30° and 45°.

A person to be photographed is placed in the chair in the portion 2. The position of the person is related to the center of the turntable and is controlled by the head and neck support 10. The chair arms are adjusted to ensure that the person remains in this position. Then the camera and projector are sighted and adjusted by the described means. The outer portion is then rotated, and pins 25 contact the micro-switch 26 sending a pulse of current to actuate the camera 9. Where lack of space does not allow the camera 9 and projector 8 to move round the object or person; the outer portion with the camera and light source is stationary, and the inner portion with the chair or plinth is rotated. The method of actuating the camera is the same.

It will be understood that the superstructure 12 may be carried by the inner portion 2 instead of the outer portion 1 of the platform or that the setting bar (and counter) can be suspended from the ceiling of the studio. As can be seen particularly from FIG. 3 only a small part of the outer portion 1 is necessary for carrying the camera 9 and projector 8. The remaining part of the outer portion 1 can therefore be dispensed with, so that the outer portion 1 can consist of a mere section of the part 1 illustrated in the drawings. This section need not be so close to the inner portion 2 as illustrated but may be at a distance therefrom.

For the variant wherein the inner portion 2 is stationary and the said reduced outer portion carrying the camera 9 and projector 8 is rotatable thereabout, the outer portion must be, of course adapted to be able to revolve about an axis which coincides with the imaginary axis passing through the photographed person or object and indicated by the setting bar 11. In the said embodiment wherein the inner and outer portions are not close to each other the inner portion 2 need not be circular and the above described outer portion can be of any shape.

It will be understood that for the variant wherein the inner portion 2 is rotatable, the outer portion, which in this variant is stationary, need not be connected to the inner portion and can be e.g. in the form of a cabinet carrying the camera and projector.

As was mentioned above a cine camera synchronized to the 360° movement can be used instead of the camera 9 having an electrically controlled shutter. If a cine camera is used the above described electric control device can be dispensed with. If the cine camera has an accurately variable film frame speed and the rotatable of the two portions is driven, e.g., by a hydraulic drive, at an accurately variable angular speed, perfect results are achieved by the photo recording assembly according to the invention. If the rotation is timed very accurately with a stroboscope and the cine camera with a stroboscope timed shutter speed is used accurate results are obtained more cheaply and with less electrical equipment than in the embodiment described in connection with the drawings.

What I claim is:

1. A photo recording assembly for making a series of photographs of an object so that the outline changes of the photographed object occurring through a preselected angular and/or longitudinal distance are recorded on conventional photographic film comprising in combination a structure having an inner and outer portion, said portions being rotatable relative to each other, means carried by said inner portion to support the photographed object, a unit carried by said outer portion and comprising a motor driven camera and a slit light projector projecting a slit of light onto said photographed object, said camera and projector being supported to be adjustable relative to each other, the speed of said relative rotation being synchronized with the rate of photographic records taken by said camera.

2. A photo recording assembly according to claim 1 including means located on the assembly to indicate the position of the axis of said relative rotation.

3. A photo recording assembly according to claim 1 wherein said camera is a still camera provided with an electrically controlled shutter and an automatic rewind mechanism connected to and controlled by an electric circuit closed and opened by a switch mechanism actuated by the said relative rotation so that a photograph is taken at regular angular intervals.

4. A photo recording assembly according to claim 1 wherein said camera is a cine camera having means for varying accurately its film frame speed, the rotatable of said two portions being driven via means for accurately varying its angular speed.

5. A photo recording assembly according to claim 1 wherein said camera is a still camera operative in response to control means including a switch actuated by the said relative rotation of the inner and outer portions so that a photograph is taken on regular angular intervals.

* * * * *